United States Patent [19]

White, Jr.

[11] Patent Number: 4,497,257

[45] Date of Patent: Feb. 5, 1985

[54] RETRACTABLE WHEELED VEHICLE

[75] Inventor: Eugene B. White, Jr., Park Forest, Ill.

[73] Assignee: White Machinery Corporation, Joliet, Ill.

[21] Appl. No.: 326,864

[22] Filed: Dec. 3, 1981

Related U.S. Application Data

[62] Division of Ser. No. 40,855, May 21, 1979, Pat. No. 4,355,584.

[51] Int. Cl.³ .................. B62D 61/12; B61H 9/00; B61F 13/00
[52] U.S. Cl. .................. 105/215 C; 74/710.5; 105/97; 188/58
[58] Field of Search ............... 105/215 C, 3, 97, 26 R, 105/90 A, 157 R; 188/58, 59; 74/710.5, 711; 213/110, 12, 18, 20, 21

[56] References Cited

U.S. PATENT DOCUMENTS

| 926,279 | 6/1909 | Miller | 213/12 |
|---|---|---|---|
| 3,344,893 | 10/1967 | Pelikan | 188/58 |
| 3,420,191 | 1/1969 | White, Jr. | 213/12 |
| 3,701,323 | 10/1972 | Cox | 105/215 C |
| 3,832,913 | 9/1974 | Helmer | 105/97 |
| 3,838,610 | 10/1974 | Fogelberg | 74/711 |
| 4,085,682 | 4/1978 | Nelson et al. | 105/157 R |
| 4,167,142 | 9/1979 | Ames | 105/26 R |
| 4,213,399 | 7/1980 | DeBrick | 105/157 R |

Primary Examiner—Richard A. Bertsch
Attorney, Agent, or Firm—Charles F. Pigott, Jr.

[57] ABSTRACT

A multiple wheeled vehicle in which at least some of the wheels are upwardly retractable by rotation of arms carrying the wheels. Hydraulic cylinders control the rotational position of the arms, and movable rods are connected to the hydraulic cylinder means. Coil springs urge the rods toward a position where the hydraulic cylinders and arm means position the wheel in a relatively downward rotational position, so that the retractable wheels may be alternatingly retracted upwardly and lowered downwardly by the hydraulic cylinder means, while also possessing a spring suspension system. Additionally or alternatively, non-retractable rail wheels may be present, being driven by internal, planetary-type, differential axle means defining internal brake means spaced centrally inwardly from the rail wheels by a distance sufficient to avoid damage to the brakes upon derailment. Likewise, center pivot coupler means may be provided in which the coupler arm has roller members to roll along a plate, to facilitate the horizontal pivotal motion.

6 Claims, 6 Drawing Figures

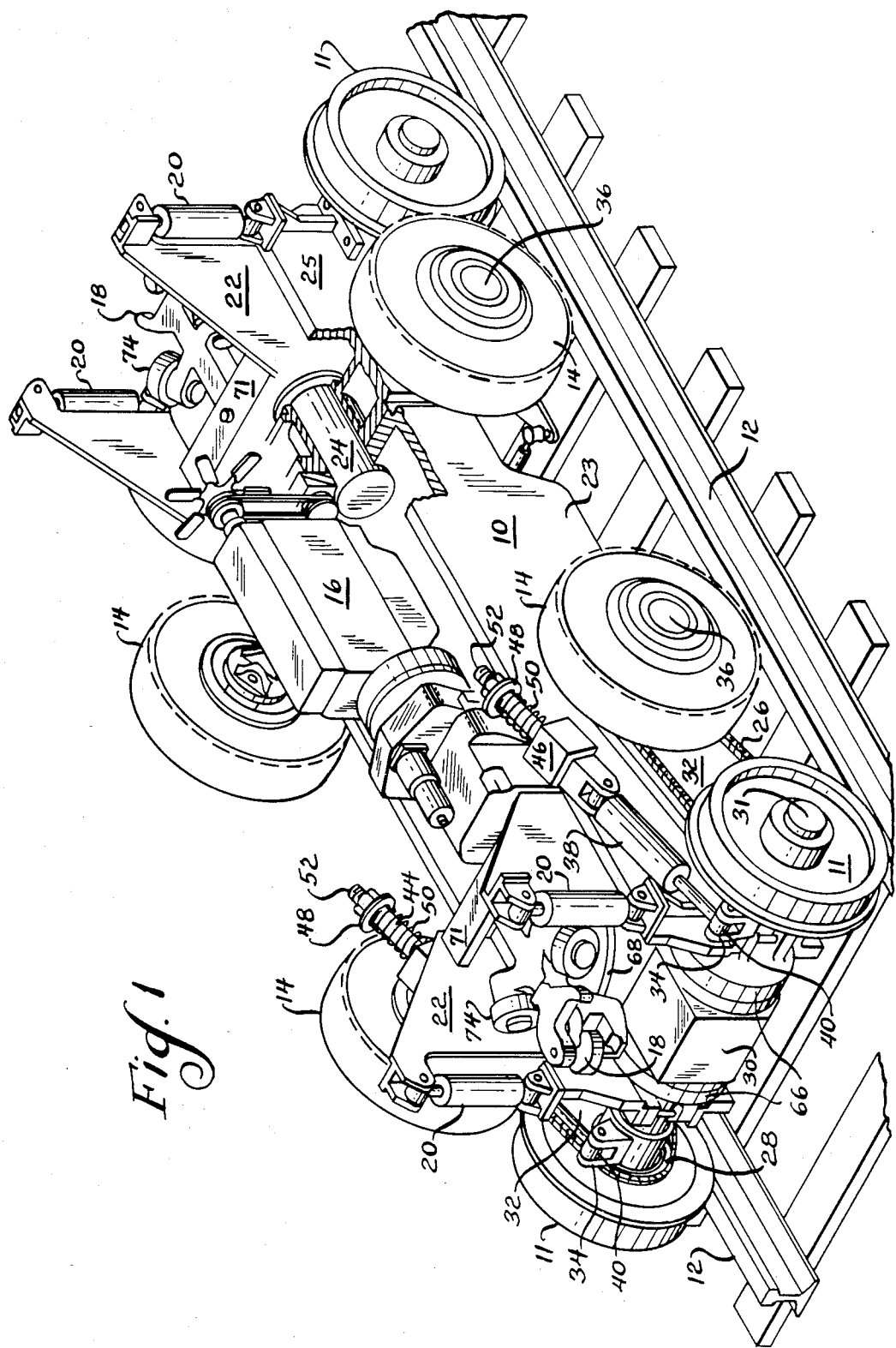

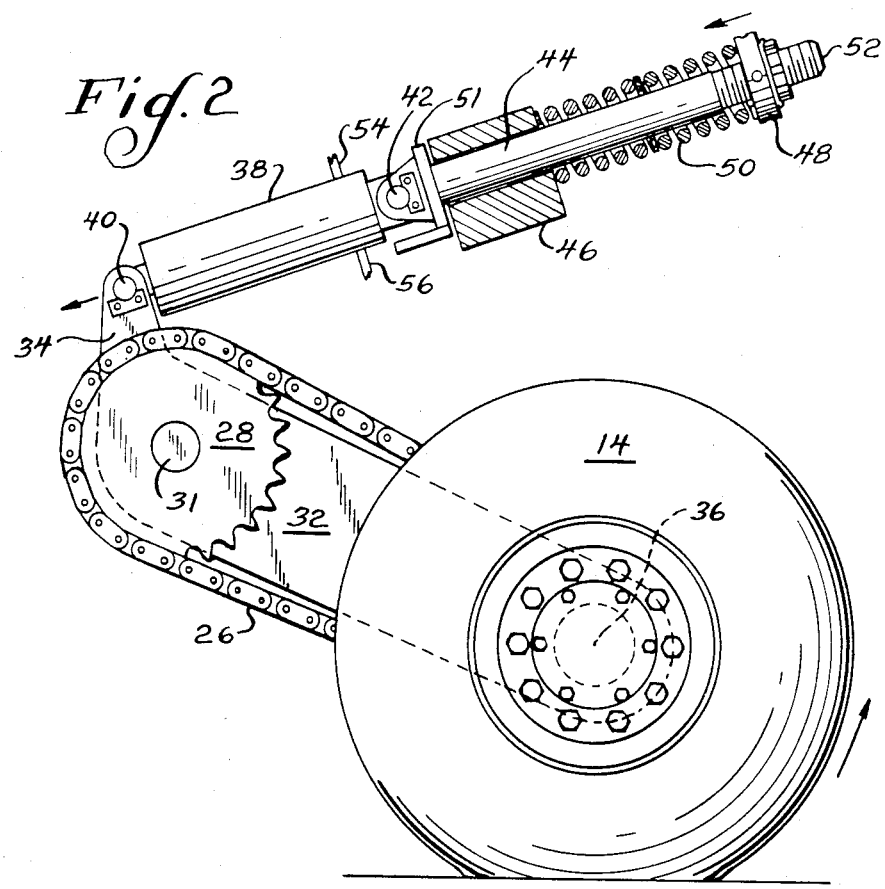
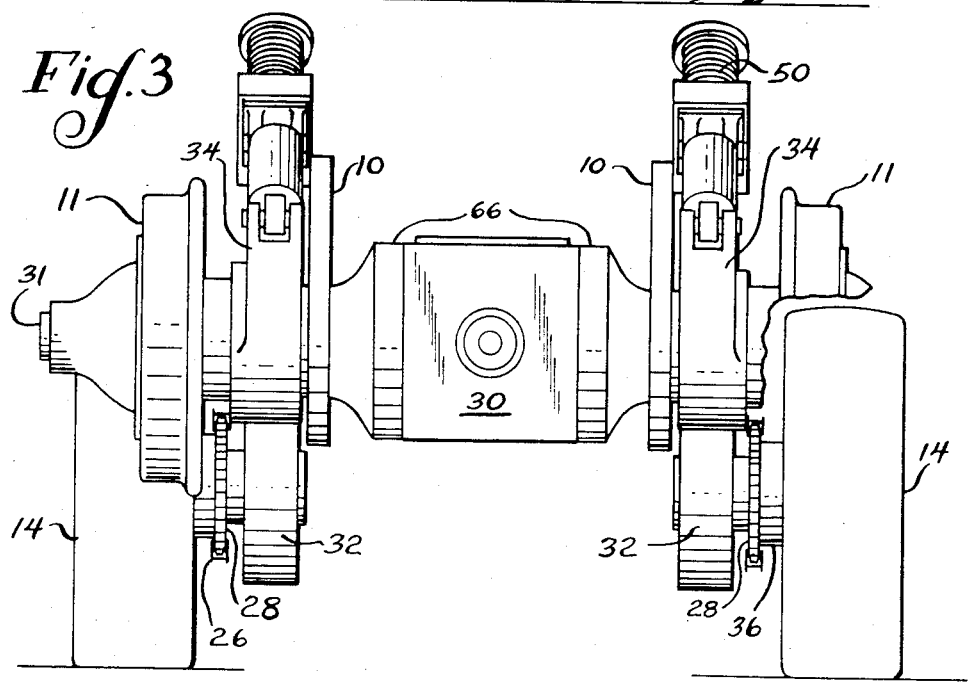

RETRACTABLE WHEELED VEHICLE

This is a division of application Ser. No. 40,855, filed May 21, 1979 now U.S. Pat. No. 4,355,584.

BACKGROUND OF THE INVENTION

Traction vehicles are commercially available for the moving of rail cars. Since a loaded rail car may be much heavier than the traction vehicle, means are provided as described, for transferring some of the weight of the railway car to the traction vehicle to provide a sufficient amount of traction to the pulling vehicle so that it can move the rail car without slippage of the wheels on the track. See, for example, U.S. Pat. Nos. 2,718,195; 3,420,191; 3,540,381; 3,232,241; and 3,892,187.

Furthermore, the traction vehicles carry retractable road wheels so that the vehicle can climb onto a railroad track, and then retract its road wheels to operate as a rail vehicle, and alternatively to lower its road wheels to permit it to leave the track and move about the yard to another track, or into a storage shed or the like.

Accordingly, this versatile vehicle can be relatively small and be powered by gasoline or diesel engine, while being capable of replacing an entire switch engine, having the added versatility of being able to operate off of the tracks as well as on the tracks.

The retractable wheeled vehicles of the prior art have exhibited certain disadvantages. One of these disadvantages is that the road wheels, being generally retractable by hydraulic cylinders, are not spring mounted in the usual manner of road wheels of a large vehicle, so that the vehicle is subject to considerable shock as it moves across rough terrain.

Furthermore, the sudden derailment of the vehicles is a fairly common circumstance, as the vehicles are climbing on or off of the rails in their accustomed manner. In many designs of the retractable wheel rail car moving vehicle, a sudden derailment can cause the rails to slam against the brake drums of the rail wheels, with the likely result of damage and loss of brake action.

Also, the center pivot-type couplers which are conventionally utilized provide the capability for lateral movement, to accommodate turning of the vehicle while under an extremely heavy load imposed by the weight transfer system which is customarily utilized to transfer weight from the rail car to the traction vehicle. Accordingly, as the coupler means does pivot under this heavy weight, granular material such as sand or the like can scour the moving surfaces, causing accelerated wear and other damage to the coupler.

In accordance with this invention, technical solutions to the above problems, as well as other advantages, are provided in an improved, retractable wheeled vehicle, which is typically contemplated for use as a rail car moving traction vehicle having the capability of operating both on and off railroad tracks.

DESCRIPTION OF THE INVENTION

In accordance with this invention, a multiple-wheeled vehicle is provided in which at least some of the wheels are upwardly retractable by rotation of arm means carrying the wheels. Hydraulic cylinder means controlling the rotational position of the arm means and wheels are also provided.

By the improvement of this invention, movable rod means are connected to the hydraulic cylinder means, while coil spring means are provided to urge the rod means toward a position where the hydraulic cylinder means and arm means position the retractable wheels in a relatively downward rotational position. As a result of this, the retractable wheels may be alternatingly retracted and lowered by the hydraulic cylinder means, while also possessing a spring suspension system.

Preferably, the arm means for each retractable wheel comprises a pair of first and second lever arms pivotable about a point and immovably fixed together. The first lower arm extends between the pivot point and the retractable wheel axle, while the second lever arm extends between the pivot point and the hydraulic cylinder means.

The first lever arm is longer than the second lever arm to provide an increased degree of up and down travel of the wheel, so that the coil spring, which of course is very strong, can also exhibit in this configuration the long wheel travel characteristics of a leaf spring found, for example, in automotive suspension systems, for a simple but effective springing system which operates in conjunction with the pivotable and retractable wheel system.

Accordingly, the road wheels, for example, of a rail car moving vehicle may be fully retractable to permit the vehicle to operate on rails with non-retractable rail wheels. At the same time, the road wheels, when depressed to elevate the rail wheels off of the rails, will exhibit a spring suspension system to protect the vehicle from shock of bumps and the like.

Preferably, the first lever arm is at least twice as long as the second lever arm, to obtain a desirable degree of travel of the retractable wheels.

Preferably, the hydraulic cylinder means includes multiple hydraulic cylinders for controlling the rotational position of the arm means and wheels. The hydraulic cylinders are interconnected with conduit means, and flow divider and pump means may be provided for forcing predetermined volumes, and equal volumes, of hydraulic fluid to the hydraulic cylinders irrespective of the individual pressures in the cylinders. As a result of this, when the road wheels of the vehicle are being depressed to lift it, the vehicle will rise in a smooth manner without oscillating back and forth, as may happen with a simple, interconnected hydraulic system in the event that the weight distribution is uneven and the like. This is due to the differential back pressures encountered in the hydraulic cylinders due to the differential weights of the sections of the vehicle. This problem may be eliminated by the use of a flow divider of a commercially available type.

It is further preferred for the rail wheels, which are typically non-retractable wheels, to be driven by an internal planetary type differential axle means which defines internal brake means spaced centrally inwardly from the rail wheels by a distance sufficient to avoid damage to the brakes upon derailment.

In conventional brakes, the drums are positioned adjacent to the wheel, generally slightly on the inside thereof. As the vehicle of this invention climbs on and off of the railroad track, it is not a rare occurrence for it to fall off of the rail by operator error of misalignment of the vehicle with respect to the rails. In the event that this happens, the rail can impact against conventional brake drums, possibly causing a breakage or rupture of the external brake drum and loss of the brakes altogether.

By the use of a commercially available differential axle means having the centrally inwardly spaced internal brake means, a sudden derailment of the vehicle of this invention is quite unlikely to result in damage to the brakes, so that the operator can simply cause the road wheels to depress once again to lift the vehicle up and to realign it once again onto the rails.

The rail car traction devices of this invention desirably carry center pivot coupler means which are generally similar to the prior art coupler means with the following exception: a horizontal plate member is provided, with the coupler arm being pivotally attached to the vehicle for horizontal motion. Roller members are attached to the coupler arm and positioned to roll along the plate. This facilitates the horizontal motion of the coupler arm under the tremendous pressures exerted on it by the weight transfer operation, while at the same time permitting the arm to pivot horizontally without scouring and other damage caused by grit or the like between a pair of heavily pressurized sliding plates.

In the drawings, FIG. 1 is a perspective view of one embodiment of a retractable-wheeled vehicle in accordance with this invention, with the cab, outer housing, and various other parts removed for purposes of clear disclosure.

FIG. 2 is a fragmentary elevational view of a retractable road wheel of the vehicle of FIG. 1 in accordance with this invention, showing the suspension system.

FIG. 3 is a fragmentary elevational view of the front of the vehicle of FIG. 1, showing the road wheel of FIG. 2 and its corresponding road wheel on the other side of the vehicle.

Figure 4:
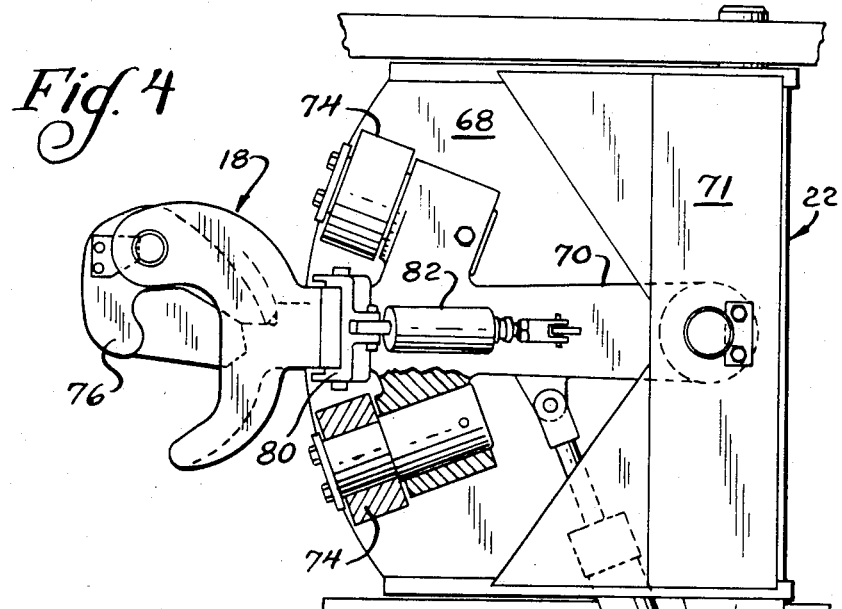
FIG. 4 is a plan view of the center pivot coupler means of this invention, as found in the vehicle of FIG. 1.

Referring to the drawings, a traction vehicle mounted on frame 10 is shown having fixed rail wheels 11, shown to be resting on rails 12, and retractable road wheels 14. Frame 10 includes a conventional motor 16, with portions such as the radiator for a cooling system removed for clarity.

Front and rear couplers 18, and front and rear pairs of weight transfer lift cylinders 20 are provided. These weight transfer cylinders lift the front and rear housings 22 which carry couplers 18, so that the couplers themselves may be raised and lowered to take weight from the railroad car that it is connected to, to obtain additional rail wheel friction characteristics to pull the rail car.

Frame 10 is divided by oscillating pivot 24 into a front portion 23 and a rear portion 25 (FIG. 1) so that portions 23, 25 of the frame can rotate about the longitudinal axis of the vehicle with respect to each other. Front frame 23 carries the front rail wheels 11, while rear frame 25 carries the rear rail wheels 11.

The effect of this system that the relative oscillation of frame portions 23, 25 permits equal loading and firm placement of the four rail wheels 11 on the track 12 despite any irregularities in the track. This is particularly valuable when the vehicle of this invention is operating under, for example, a 40,000 pound weight transfer load, and assists in the avoidance of derailment.

Other features which are shown in FIGS. 2 and 3, are a chain drive 26, by which each of the front road wheels 14 are connected to front rail wheels 11 through sprockets 28.

Internal planetary-type differential axles 30 are provided to each of the front and rear pairs of rail wheels 11 to provide power to them from motor 16, as well as providing differential power to the front road wheels 14 through the chain drive 26.

Preferably, differential axle 30 includes a locking differential system in which power is automatically imparted to a non-slipping wheel in the event the other wheel is slipping. Such a system is commercially available in conjunction with the internal planetary-type differential axle 30 used herein.

In accordance with this invention, each retractable front and rear wheel 14 is carried by a rotatable lever arm 32 which is pivotable about the center of rotation of axle 31 of wheels 11. First arm 32 is immovably fixed together with a second lever arm 34. The arms may comprise a single piece.

First lever arm 32 extends between axle pivot point 31 and the wheel axle 36 of its wheel 14. Second lever arm 34 extends between axle pivot point 31 and a hydraulic cylinder 38, the operating end 40 of which is pivotally attached to second lever arm 34.

Accordingly, as the operating end 40 of cylinder 38 is advanced outwardly from the cylinder 38, second lever arm 34 rotates counter-clockwise as shown in FIG. 2, causing the first lever arm 32 to also rotate counter-clockwise. This will lift wheel 14 off of the ground into the retracted or raised position. Correspondingly, as operating end 40 of cylinder 38 is retracted back into the cylinder 38, arms 34 and 32 move clockwise to permit wheel 14 to be lowered once again to run the vehicle on road wheels 14.

The other end of hydraulic cylinder 38 is pivotally attached at 42 to a rod member 44, which passes through a brace 46 attached to the frame 10 of the vehicle. Rod member 44 carries a retainer 48 at its end.

Between a retainer 48 and brace 46 a coil spring 50 is positioned, to exert force on rod member 44 to urge it toward a position in which the cylinder means 38 and lever arms 32, 34 position the retractable wheels 14 in a relatively downward or lowered rotational position.

Accordingly, two independent retracting actions can operate in the structure as shown in FIG. 2. One of the retracting actions is governed by cylinder 38 in which its operating end 40 can rotate lever arms 32, 34 either clockwise or counter-clockwise to raise or lower its wheel 14.

At the same time, in any fixed position of operating end 40 of hydraulic cylinder 38, and particularly when wheel 14 is lowered, and encountering bumps in the ground, an upward bump imparted to wheel 14 by a rough spot in the road causes lever arms 32, 34 to rotate counter-clockwise, and the entire hydraulic cylinder 38 and rod 44 to correspondingly move to the left, compressing coil spring 50. Accordingly, the shock from a bump encountered by wheel 14 is absorbed, with coil spring 50 then extending back to a normal position immediately after the shock has been dissipated.

The maximum extent of downward rotation of each wheel 14 is limited by the abutment of collar 51 on rod 44 against brace 46.

Retainer 48 is threadedly attached by means of threads 52 to rod 44 so that it may be adjustably positioned on the rod, for appropriate adjustment of the pre-compression on coil spring 50.

Furthermore, lever arm 32 is longer than lever arm 34, and is preferably at least twice as long as arm 34, to increase the amount of upward and downward travel that coil spring 50 will permit wheel 14 to engage in. Accordingly, although a coil spring is used, a system such as that shown herein can assume desirable characteristics of a leaf spring type suspension system, such as is conventionally used in automobiles and the like.

Figure 6:
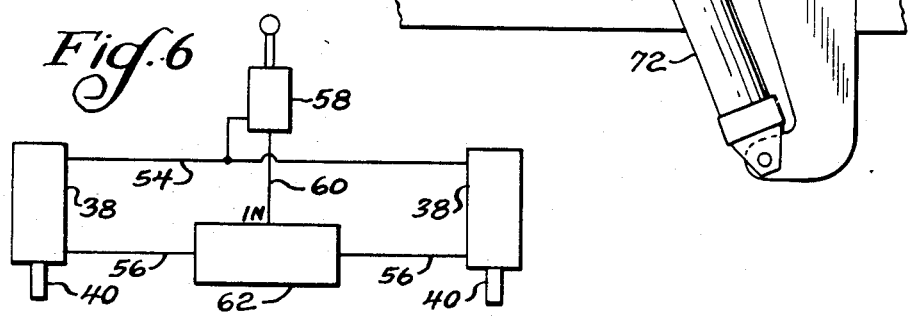
FIG. 6 is a schematic view of a portion of the hydraulic system which controls the hydraulic cylinders of road wheels of FIGS. 2 and 3.

Referring to FIG. 6, a partial schematic view of the hydraulic control system of this invention is disclosed. Hydraulic lines 54, 56 provide an inlet and an outlet of hydraulic fluid through pairs of hydraulic cylinders 38 that control front road wheels 14. Hydraulic control valve 58 provides hydraulic fluid through flow line 60 to a flow divider 62 which is a gear proportioning device adapted for forcing equal volumes of hydraulic fluid to each of the hydraulic cylinders, irrespective of the individual pressures in the cylinders. Specifically, flow divider 62 will be adapted to force equal volumes of hydraulic fluid to each of the hydraulic cylinders 38 when pressurization takes place, so that in the event of a weight imbalance sensed by the road wheels 14, the road wheels will not be forcefully lowered in an uneven or oscillating manner, but will each lower evenly with respect to the other road wheels, irrespective of weight imbalance, contrary to the situation of a simple, interconnected hydraulic system in the absence of a flow divider.

A typical flow divider which may be used as member 62 in accordance with this invention may be a gear type fluid flow divider with one inlet and two outlets, manufactured, for example, by the Delta Power Hydraulic Company of Rockford, Ill.

Upon depressurization of the cylinders, hydraulic fluid passes from cylinders 38 through conduit 54, back to the hydraulic control valve 58 which includes a reservoir for the fluid.

The cylinders 38 which raise and lower the rear road wheels 14 may be of similar construction, or may be simply hydraulically interconnected.

Accordingly, the vehicle of this invention may be raised and lowered by the action of road wheels 14 for operating on the ground with the lowered road wheels, or operating on a railroad track with the road wheels 14 raised or retracted, and the fixed rail wheels 11 resting on the track 12.

FIG. 1 shows the road wheels 14 in a raised position with the rail wheels 11 resting on the track. FIGS. 2 and 3 show the reverse situation, in which the road wheels 14 are lowered to elevate the whole vehicle, including the rail wheels, for operation on the ground.

Both sets of front and rear rail wheels 11 are driven by a differential axle 30 which includes internal planetary-type gears and which, in turn, defines internal brake means, spaced centrally inwardly of frame 10 as at 66 by a distance which is sufficient to avoid damage to the brake means upon derailment. Typically, encased, wet-type disc brakes running in oil may be used for the braking means 66, avoiding any outside atmospheric contamination.

Preferably, the specific differential axle 30 which is utilized is of the type that possesses a locking differential, so that power is automatically provided to a non-slipping wheel when the other wheel on the differential axle is slipping.

As an added advantage of this type of structure, only one lubrication port is needed, rather than multiple lubrication ports of other systems. A suitable axle assembly which may be utilized for the differential axle means of this invention is a John Deere AN52 axle assembly including an internal planetary final drive, spiral bevelled pinion and gears, and the hydraulic wet disc brakes as described.

A conventional transmission may connect motor 16 and differential axle means 30.

Figure 5:
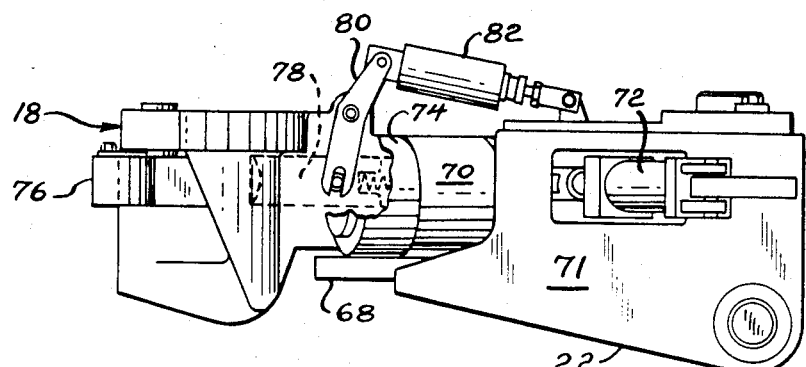
FIG. 5 is a fragmentary elevational view of the center pivot coupler means of FIG. 4.

With respect to coupler 18 which is found at both the front and rear of the frame 10, details are shown by FIGS. 4 and 5. A horizontal coupler box plate 68 is provided, with coupler arm 70 being pivotally attached to the coupler box 71 for horizontal motion, being controlled by hydraulic cylinder 72. Roller members 74 are attached to coupler arm 70, and are positioned to roll along plate 68 as cylinder 72 causes coupler arm 70 to pivot. This facilitates the horizontal motion of arm 70, to permit horizontal motion under extremely heavy weight conditions without damage or abrasion between arm 70 and coupler box plate 68. Conventional lock knuckle 76 is similar to that used, for example, on the Switchmaster 7000 Heavy Duty Rail Car Mover, sold by the White Machinery Corporation of Joliet, Ill. For operation, plunger 78 is retractable, with lock knuckle 76 being freed by such retraction to rotate clockwise, operated by cylinder 82, activating yoke 80 which retracts plunger 78.

Accordingly, an improved retractable wheel vehicle is provided, having advantages as previously described.

The above has been offered for illustrative purposes only, and is not intended to limit the invention of this application, which is as defined in the claims below.

That which is claimed is:

1. In a railcar moving vehicle of the type having rail wheels 11 for travelling on railroad track 12 and road wheels 14 for travelling on road, the improvement comprising, in combination, a pair of front rail wheels 11 and a pair of rear rail wheels 11, a pair of front road wheels 14 and a pair of rear road wheels 14, said front and rear road wheels 14 being movable between raised inoperative positions and lowered operative positions by hydraulic cylinder means 38, and said front and rear rail wheels 11 being non-retractable so that said vehicle can move on rail when said road wheels are retracted and can move on roadway when said road wheels are extended down, said front pair of rail wheels 11 being mounted directly on a first internal planetary-type differential axle 30 having internal brake means 66, said rear pair of rail wheels being mounted directly on a second internal planetary-type differential axle 30 having internal brake means 66, and chain drive means 26 between one of said pairs of rail wheels 11 and an adjacent pair of road wheels 14 for providing differential drive to said pair of road wheels 14.

2. A railcar moving vehicle as defined in claim 1 where said internal brake means 66 in each of said first and second internal planetary-type differential axles 30 is spaced substantially inwardly from the adjacent rail wheels 11 so as to avoid damage to such brake means in the event of derailment.

3. A railcar moving vehicle as defined in claim 1 where each of said first and second internal planetary-type differential axles 30 is of the type having a locking differential so that power is provided to a non-slipping wheel when the other wheel on the differential axle is slipping.

4. A railcar moving vehicle as defined in claim 1 where a chain drive sprocket 28 is mounted directly on one of said differential axle shafts 30,31 for driving said chain drive means 26.

5. In a railcar moving vehicle of the type having rail wheels 11 for travelling on railroad track 12 and road wheels 14 for travelling on road, the improvement comprising, in combination, a pair of front rail wheels 11 and a pair of rear rail wheels 11, a pair of front road wheels 14 and a pair of rear road wheels 14, said front and rear road wheels being movable between raised inoperative positions and lower operative positions by hydraulic cylinder means 38, and said front and rear rail wheels 11 being non-retractable, whereby said vehicle can move on rail 12 when said road wheels 14 are retracted and can move on roadway when said road wheels are extended down, said front pair of rail wheels 11 being mounted on a first internal planetary-type differential axle 30, said rear pair of rail wheels 11 being mounted on a second internal planetary-type differential axle 30, said first and second differential axles each having a locking differential so power is provided to a non-slipping wheel 11 when the other wheel on the differential axle is slipping, and each of said first and second differential axles 30 having internal brake means 66 spaced substantially inwardly from the adjacent rail wheels 11 to avoid damage to such brake means in the event of derailment, and chain drive means 26 between said front pair of rail wheels 11 and said front pair of road wheels 14 for providing differential drive to said front pair of road wheels.

6. A railcar moving vehicle as defined in claim 5 where a chain drive sprocket 28 is mounted directly on the front one of said differential axles 30,31 for driving said chain drive means 26 to provide differential drive to said front pair of road wheels.

* * * * *